(12) United States Patent
Takata

(10) Patent No.: US 8,804,213 B2
(45) Date of Patent: Aug. 12, 2014

(54) IMAGE READING DEVICE INCLUDING A FEEDING GUIDE, AND AN IMAGE FORMING APPARATUS INCLUDING THE SAME

(75) Inventor: Sohichi Takata, Osaka (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 787 days.

(21) Appl. No.: 13/026,515

(22) Filed: Feb. 14, 2011

(65) Prior Publication Data

US 2011/0199654 A1    Aug. 18, 2011

(30) Foreign Application Priority Data

Feb. 18, 2010 (JP) ................. 2010-033180

(51) Int. Cl.
*H04N 1/04* (2006.01)

(52) U.S. Cl.
USPC .......................................................... 358/498

(58) Field of Classification Search
CPC .......... G03G 2215/00362; G03G 2215/00367; G03G 2215/00371; G03G 2215/00392; G03G 2215/00409; G03G 2215/0535; G03G 2215/00548; G03G 2215/00552; G03G 2215/00603; G03G 2215/00734; G03G 2215/00924; G03G 2215/00945
See application file for complete search history.

(56) References Cited

U.S. PATENT DOCUMENTS

2007/0127962 A1* 6/2007 Fukumura .................... 399/367

FOREIGN PATENT DOCUMENTS

| JP | 6-115789 | 4/1994 |
| JP | 8-133552 A | 5/1996 |
| JP | 2002-094740 A | 3/2002 |
| JP | 2007-264641 A | 10/2007 |

* cited by examiner

*Primary Examiner* — Benny Q Tieu
*Assistant Examiner* — Sunil Chacko
(74) *Attorney, Agent, or Firm* — Nixon & Vanderhye P.C.

(57) ABSTRACT

An ADF defines a document feed path inclined downwardly from above a document platen. Feeding means is disposed downstream of a first reading glass plate and accommodated in a downwardly protruding portion. The protruding portion is accommodated in a dent portion of an image reading unit. The feeding means includes a feeding guide having a downstream side serving as a supporting point and an upstream side supported at the supporting point for pivotal movement about an axis parallel with the widthwise direction of the document feed path. The feeding guide is exposed out of the feeding means on the document platen side. When the ADS is closed while a document is in a state of extending off the document platen onto the dent portion, the upstream side of the feeding guide is pressed up by the document to move into an upper position.

8 Claims, 10 Drawing Sheets

IMAGE READING DEVICE INCLUDING A FEEDING GUIDE, AND AN IMAGE FORMING APPARATUS INCLUDING THE SAME

CROSS REFERENCE

This Nonprovisional application claims priority under 35 U.S.C. §119(a) on Patent Application No. 2010-033180 filed in Japan on Feb. 18, 2010, the entire contents of which are hereby incorporated by reference.

BACKGROUND OF THE INVENTION

The present invention relates to an image reading device capable of reading images of documents being fed one by one and an image of a document placed on a document platen, as well as an image forming apparatus provided with such an image reading device.

One conventional image forming apparatus 130 as illustrated in FIG. 9 includes an image reading unit 20 having a top surface provided with a document platen 21 for placing a document thereon, and a document feeding unit 120 capable of covering and uncovering a top surface of the document platen 21. The image reading unit 20 includes first image reading means 23. The first image reading means 23 reads the image of a document placed on the document platen 21 positioned horizontally as a first document reading position R1 while moving parallel with the document platen 21. Alternatively, the first image reading means 23 reads the image of a document fed by the document feeding unit 120 by stopping the document at a second document reading position R2 which is different from the first image reading position R1. For this reason, the first and second image reading positions R1 and R2 lie in the same plane in the image reading unit 20.

The document feeding unit 120 defines therein a document feed path 101 for feeding documents one by one via the second document reading position R2. The document feeding unit 120 has a feed path (comprising the document feed path 101 and a branch path 102) extending from a document load tray 91 for accommodating therein documents to be read up to a document catch tray 93 for receiving documents finished with image reading via the second document reading position R2. The document load tray 91 and the document catch tray 93 are often disposed above the document platen 21 in such a manner that the trays 91 and 93 are positioned in tier to meet a request for space saving.

The feed path needs to pass the second reading position R2 which lies in the same plane as the document platen 21. The feed path is provided with a plurality of feed roller pairs each configured to feed a document by nipping it therebetween. At least a part of the feed roller pairs is located above the document platen 21. Therefore, the feed path includes a sloped portion (i.e., document feed path 101) which is inclined downwardly as it extends from the document load tray 91 located above the document platen 21 toward the second document reading position R2, and a curved portion (i.e., branch path 102) extending from the second document reading position R2 toward the document catch tray 93 located above the document platen 21. Small-sized documents, such as cards and business cards, are likely to cause feeding failures, such as damage to documents and paper jam, due to their deformation in the curved portion (i.e., branch path 102).

In order to reduce the number of occurrences of such feeding failures of small-sized documents, an image forming apparatus described in Japanese Patent Laid-Open Publication No. HEI6-115789 is provided with a document feed path 103 extending substantially horizontally from the downstream side of the second document reading position R2, in addition to the curved portion (i.e., document feed path 102), as shown in FIG. 9. In such an image forming apparatus 130, the document catch tray 92 is located downstream of the second document reading position R2 in the document feeding direction and positioned lower than the second document reading position R2, while a protruding portion 201 which accommodates therein feeding members, such as feed roller pairs located downstream of the second document reading position R2, protrudes downwardly from a bottom surface of the document feeding unit 120. On a top surface of the image reading unit 20, a dent portion 131 shaped to fit the protruding portion 201 of the document feeding unit 120 is formed near the document platen 21 to accommodate the protruding portion 201.

However, the dent portion 131 formed on the top surface of the image reading unit 20 at a location adjacent the document platen 21 raises the following problem. That is, in cases where only one page of a two-page spread of a book is to be read or in like cases, the document is sometimes placed in such manner that only part of the document (which is the part to be read) is positioned on the document platen 21 (i.e., first reading position R1) while the rest of the document (which does not need to be read) positioned to extend off the document platen 21 onto the dent portion 131, as shown in FIG. 10. In this case, a problem arises that the part of the document which extends off the document platen 21 onto the dent portion 131 is caught between the protruding portion 201 of the document feeding unit 120 in the closed position and the dent portion 131 to damage the document (see the point indicated by the non-relief arrow in FIG. 10).

A feature of the present invention is to provide an image reading device which is capable of making the feed path of the document feeding unit substantially straight without damage to a document placed to extend off the document platen 21, thereby suppressing the occurrence of the small-sized document feeding failure.

SUMMARY OF THE INVENTION

An image reading device according to the present invention includes: an image reading unit having a top surface provided with a document platen and a reading glass plate located adjacent to one end of the document platen; and a document feeding unit capable of covering and uncovering a top surface of the document platen.

The document feeding unit includes a feed path, feeding means, and a protruding portion. The feed path is inclined downwardly from above the document platen to pass the reading glass plate. A document fed into the feed path passes the reading glass plate. The feeding means is disposed downstream of the reading glass plate and positioned lower than the document platen. The protruding portion protrudes downwardly from a bottom surface of the document feeding unit and accommodates the feeding means therein. The image reading unit includes a dent portion. The dent portion accommodates the protruding portion of the document feeding unit and is located opposite away from the document platen across the reading glass plate.

The feeding means includes a feeding guide forming part of a bottom surface of the feed path and having a downstream end in a document feeding direction of the feed path which serves as a supporting point and an upstream-side portion extending upstream of the supporting point and supported at the supporting point for pivotal movement about an axis parallel with a direction perpendicular to the document feeding direction. The upstream-side portion of the feeding guide is exposed out of the protruding portion on the document platen side.

With this arrangement, when the document feeding unit is closed while a document is in a state of failing to extend off the document platen onto the dent portion, the upstream-side portion of the feeding guide descends by its own weight to form part of the document feed path. Alternatively, when the document feeding unit is closed while the document is in a state of extending off the document platen onto the dent portion, the upstream-side portion of the feeding guide is pressed up into an upper position by the portion of the document which extends off the document platen onto the dent portion to prevent that portion of the document from lowering.

Preferably, the feeding guide comprises a plurality of feeding guides individually supported in the direction perpendicular to the document feeding direction.

With this feature, even when the frame of the document feeding unit has warpage, distortion or the like which has occurred during manufacture or use, such warpage, distortion or the like is not likely to form a factor that impedes the document feeding because the feeding guides can individually move into respective appropriate positions.

Preferably, the document feeding unit includes a branch path, detection means and switching means. The branch path branches off upwardly from a branch point on the feed path which is located downstream of the reading glass plate. The detection means is configured to detect the size of a document to be fed into the feed path. The switching means is configured to feed a document either into a portion of the feed path which extends downstream of the reading glass plate or into the branch path selectively. The switching means feeds the document into the portion of the feed path which extends downstream of the reading glass plate when the size of the document detected by the detection means is smaller than a predetermined size.

With this feature, the document feeding unit feeds a small-sized document, which is easy to cause a feeding failure such as paper jam, into the feed path inclined downwardly from above the document platen and hence reduces the likelihood of such a feeding failure.

An image forming apparatus according to the present invention comprises the image reading device and an image forming section configured to form an image on a recording sheet based on image data read from a document by the image reading device.

The image reading device is capable of making the feed path of the document feeding unit substantially straight without damage to a document placed to extend off the document platen, thereby suppressing the occurrence of the small-sized document feeding failure.

These and other features and advantages of the present invention will become more apparent from the following detailed description of the invention in connection with the accompanying drawings.

DETAILED DESCRIPTION OF THE INVENTION

Hereinafter, an image forming apparatus 100 including an image reading device 130 according to an embodiment of the present invention will be described reference to the drawings. The image reading device may be included in a copier or a facsimile apparatus instead of the image forming apparatus 100 as a multifunctional apparatus.

Figure 1:
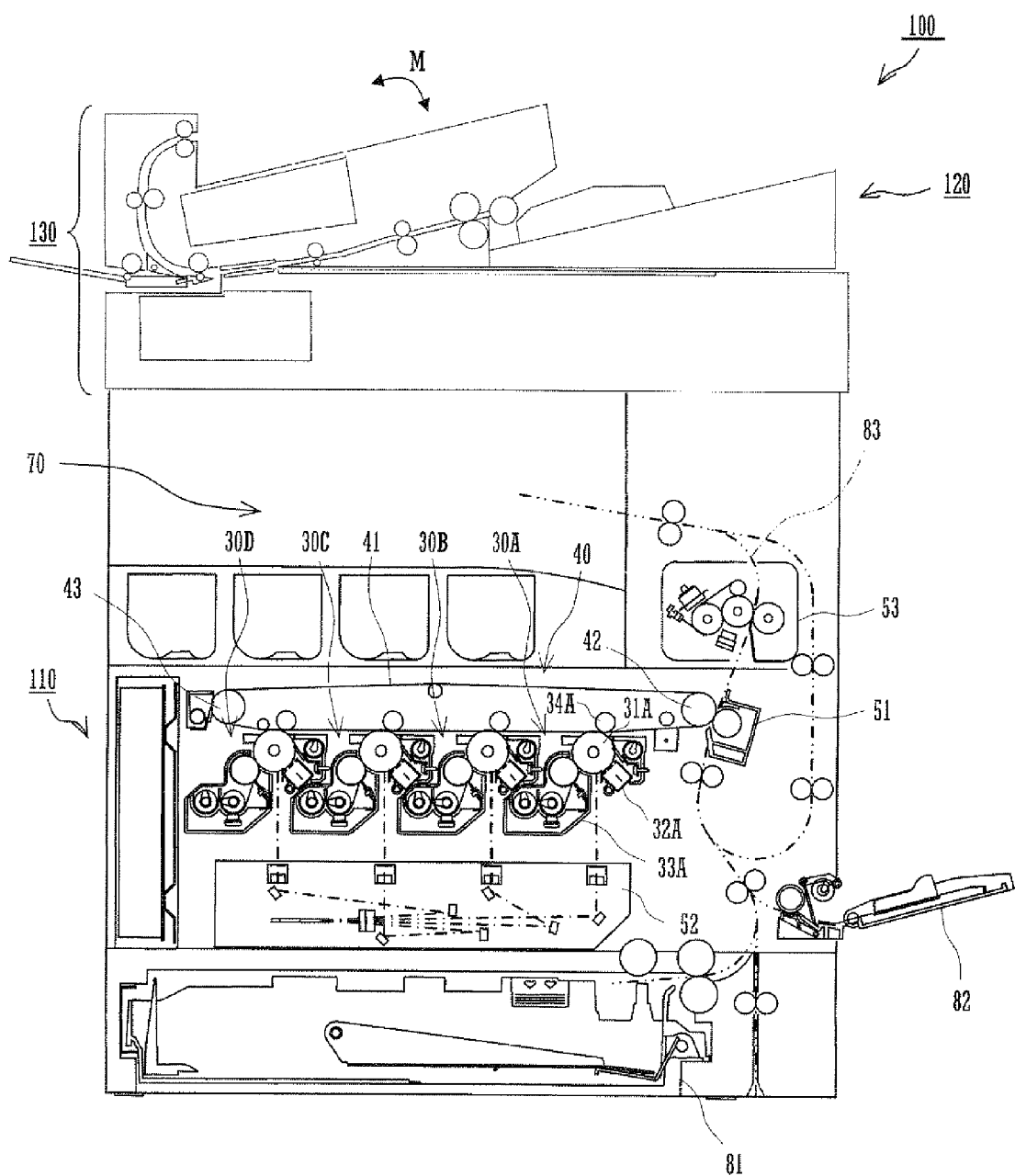
FIG. 1 is a sectional front view schematically illustrating an image forming apparatus.

The image forming apparatus 100 comprises an apparatus body 110 and the image reading device 130 as shown in FIG. 1 and is configured to form a polychrome or monochrome image on a recording sheet in accordance with image data transmitted thereto from the outside.

The apparatus body 110 includes an intermediate transfer belt unit 40, image forming stations 30A to 30D, a secondary transfer unit 51, an exposure unit 52, and a fixing unit 53. The intermediate transfer belt unit 40 includes an endless intermediate transfer belt 41 which is rotatably entrained about a driving roller 42, a driven roller 43 and the like.

The image forming stations 30A to 30D are configured to perform electrophotographic image formation using developers of respective colors, i.e., black, cyan, magenta and yellow. For example, the image forming station 30A includes an electrostatic charger 32A, a developing device 33A and a primary transfer device 34A which are disposed around a photoreceptor drum 31A. The image forming stations 30B to 30D are each similar in configuration to the image forming station 30A.

The exposure unit 52 is configured to drive a semiconductor laser (not shown) based on image data items corresponding to the respective colors, i.e., black, cyan, magenta and yellow which are read by the image reading device 130 to distribute laser light images corresponding to the respective colors to the image forming stations 30A to 30D. The exposure unit 52 may employ a light source comprising, for example, an LED array configured to be driven based on image data, other than the semiconductor laser.

In the image forming station 30A for example, the peripheral surface of the photoreceptor drum 31A is electrostatically charged uniformly by the electrostatic charger 32A and then exposed to laser light distributed from the exposure unit 52 according to the black image data item. By so doing, an electrostatic latent image according to the black image data item is formed on the peripheral surface of the photoreceptor drum 31A. Thereafter, the peripheral surface of the photoreceptor drum 31A is supplied with the developer corresponding to black to visualize the electrostatic latent image into a black toner image. The toner image thus formed on the peripheral surface of the photoreceptor drum 31A is transferred onto a surface of the intermediate transfer belt 41 by the primary transfer device 34A.

In color image formation, the image forming stations 30B to 30D carry out the same process for the respective colors, i.e., cyan, magenta and yellow, as does the image forming station 30A. The resulting black, cyan, magenta and yellow toner images are superimposed on one another on the surface of the intermediate transfer belt 41.

The apparatus body 110 further includes a sheet feed cassette 81, a manual feed tray 82, and a sheet feed path 83. The sheet feed cassette 81 accommodates therein a plurality of recording sheets of a size and type which is used with a relatively high frequency. The manual feed tray 82 places thereon a recording sheet of a size and type which is used with a relatively low frequency.

The sheet feed path 83 is formed to extend from the sheet feed cassette 81 and the manual feed tray 82 to an output section 70. The sheet feed path 83 is provided with the secondary transfer unit 51 and the fixing unit 53. The secondary transfer unit 51 transfers the toner image born on the surface of the intermediate transfer belt 41 onto a recording sheet. The fixing unit 53 heats and pressurizes the recording sheet bearing the toner image transferred thereto to fix the toner image to the recording sheet.

Figure 2:
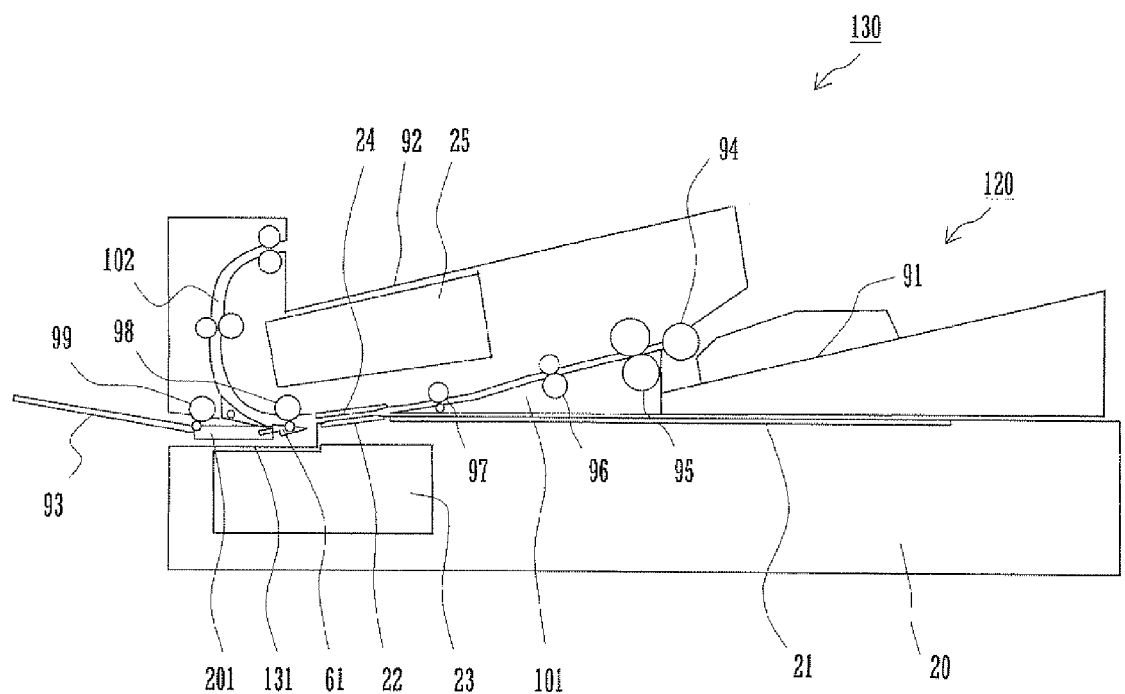
FIG. 2 is a sectional front view schematically illustrating an image reading device.
Figure 3:
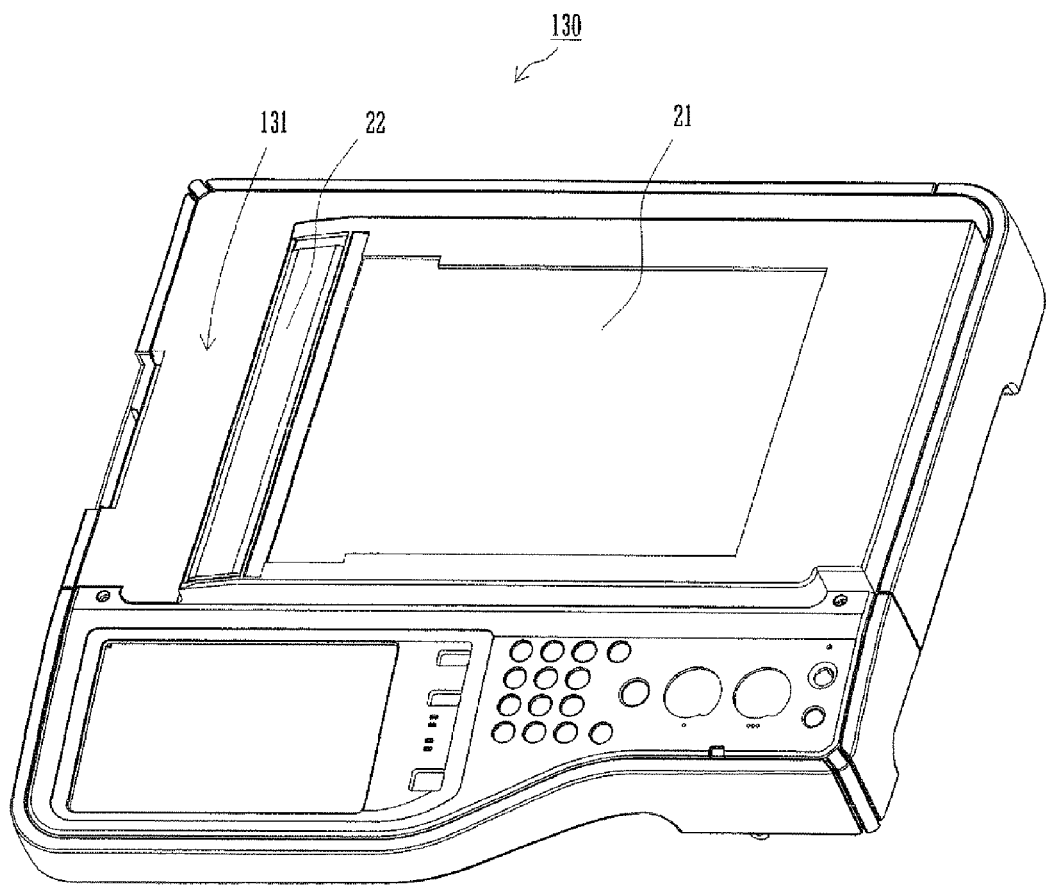
FIG. 3 is an external view illustrating an image reading unit as viewed from above.
Figure 4:
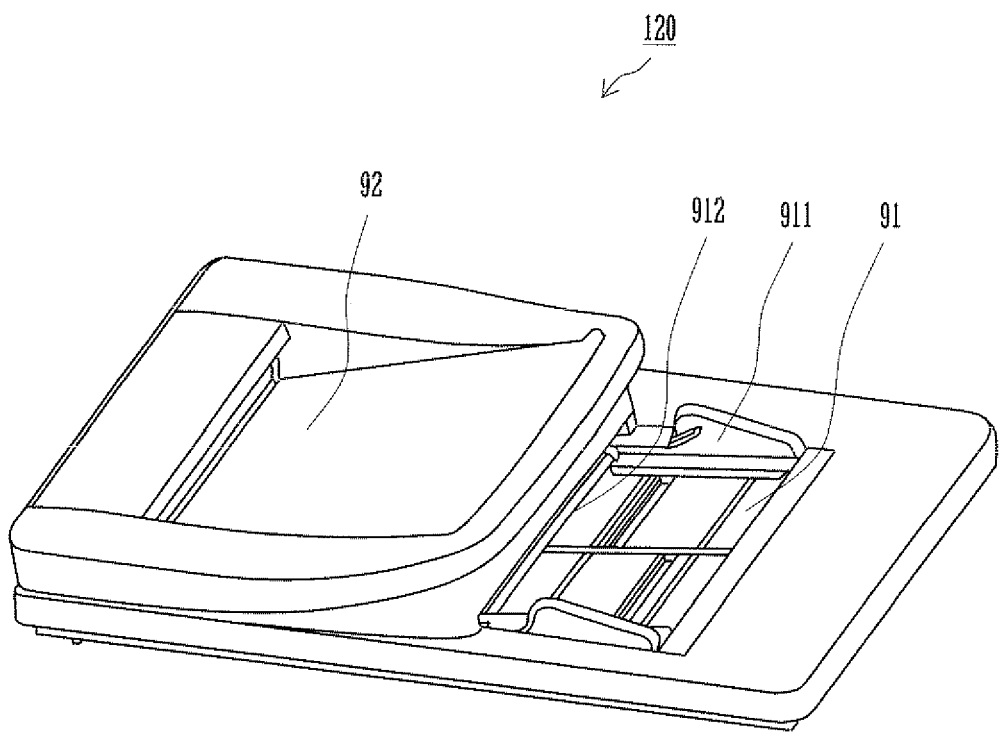
FIG. 4 is an external view illustrating an automatic document feeder.

Description will be made of the image reading device 130 with reference to FIGS. 2 to 4. As shown in FIG. 2, the image reading device 130 includes an automatic document feeder (ADF) 120 (which is equivalent to the "document feeding unit" defined by the present invention) and an image reading unit 20.

The image reading unit 20 includes a dent portion 131, a document platen 21 and a first reading glass plate 22 which are juxtaposed to each other on a top surface of the image reading unit 20, and first document reading means 23 disposed below them. The document platen 21 and the first reading glass plate 22 are each formed of a hard glass plate. The document platen 21 is positioned horizontally. The dent portion 131 is located opposite away from the document platen 21 across the first reading glass plate 22 (see FIG. 3). The first reading glass plate 22 is inclined downwardly from a position higher than the document platen 21.

The image reading unit 20 has first document reading means 23 horizontally movably disposed below the document platen 21 and the first reading glass plate 22. The first document reading means 23 reads the image of each of documents passing the first reading glass plate 22 after having been fed one by one or the image of a document placed on the document platen 21. The first document reading means 23 irradiates the image bearing side of a document with light from the light source and then generates image data based on reflected light from the image bearing side of the document.

The optical path length up to the image bearing side of the document passing the first reading glass plate 22 is equal to the optical path length up to the image bearing side of the document placed on the document platen 21. Therefore, the image reading unit 20 has an image reading position on the first reading glass plate 22 and an image reading position on the document platen 21 which lie in the same plane.

The ADF 120 is mounted for pivotal movement about its rear edge in directions indicated by arrow M in FIG. 1 so as to cover and uncover the top surface of the document platen 21. When the top surface of the document platen 21 becomes uncovered by causing the ADF 120 to pivot so as to raise the front edge of the document platen 21, a document can be placed on the document platen 21 manually without use of the ADF 120.

The ADF 120 further includes second document reading means 25. The second document reading means 25 reads the image of each of documents fed one by one when it passes a second reading glass plate 24. The second reading glass plate 24 is opposed to the first reading glass plate 22 across a document feed path 101.

In reading the image of the document placed on the document platen 21, the image reading unit 20 moves the first document reading means 23 to below the document platen 21. The first document reading means 23 moves horizontally below the document platen 21 to read the image of the document placed on the document platen 21.

In reading the image of each document fed by the ADF 120, the image reading unit 20 moves the first document reading means 23 to below the first reading glass plate 22. The first document reading means 23 reads a first side of the document fed by the ADF 120 when the document passes the first reading glass plate 22, while the second document reading means 25 reads a second side of the document when the document passes the second glass plate 24.

The ADF 120 defines a feed path (including the document feed path 101 on the upstream side of the first reading glass plate 22 and a document feed path 103 on the downstream side of the first reading glass plate 22) which extends from a document load tray 91 to a document catch tray 93 via the first reading glass plate 22. The ADF 120 also defines a branch path 102 on is the downstream side of the first reading glass plate 22 which extends to reach a document catch tray 92. The feed path is inclined downwardly from above the document load tray 21.

Particularly that portion of the feed path which extends between feed roller pairs 97 and 98 disposed on the upstream side and the downstream side, respectively, of the first reading glass plate 22 is formed straight. This enables the images of a document being fed on the feed path to be read accurately by the first document reading means 23 and the second document reading means 25.

Figure 5:
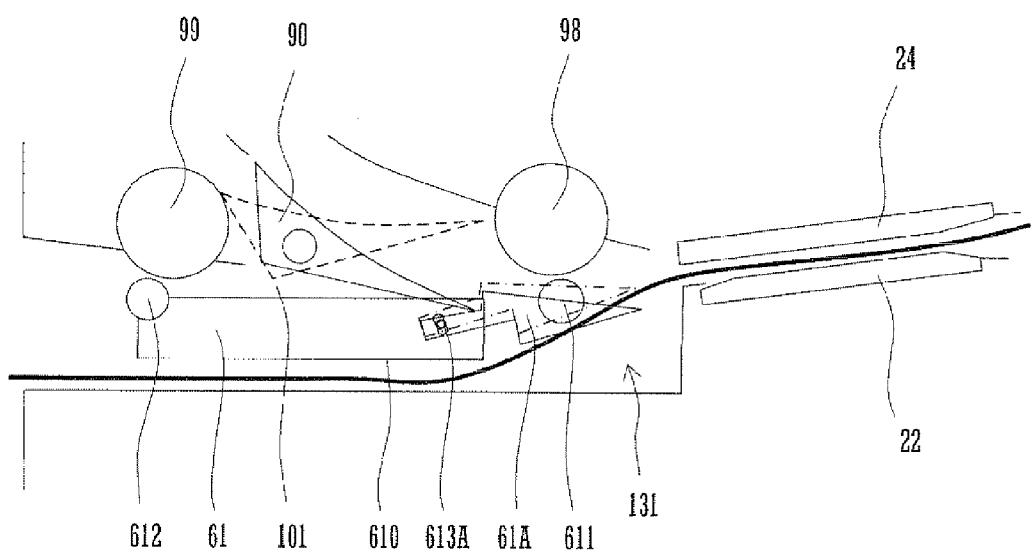
FIG. 5 is a partially enlarged sectional front view schematically illustrating the image reading device.

As shown in FIG. 5, the document feed path 103 on the downstream side of the first reading glass plate 22 is provided with a gate 90 (which is equivalent to the "switching means" defined by the present invention) at a branch point from which the branch path 102 extending to the document catch tray 92 branches off and which is located downstream of the feed roller pair 98. The gate 90 is controlled by a control section (not shown) and has a downstream-side portion which is located downstream in the document feeding direction of the document feed path 103 and serves as a supporting point and an upstream-side portion which supported at the supporting point for pivotal movement about an axis parallel with a direction perpendicular to the document feeding direction (hereinafter will be referred to as "the widthwise direction of the document feed path 103"). Upon detection of the size of a document, the control section causes the gate 90 to pivot by switching energized state of a solenoid (not shown), thereby performing switching between the document feed path 103 (i.e., the feed path extending downstream of the gate 90) and the branch path 102.

When the document to be fed has a smaller size than a predetermined size, the control section causes the upstream-side portion of the gate 90 to pivot into a position indicated by broken line in FIG. 5, thereby performing switching to the document feed path 103 reaching the document catch tray 93. The "document having a smaller size than the predetermined size" is meant to include business cards and other cards for example. When the size of the document to be fed is not smaller than the predetermined size, the control section causes the upstream-side portion of the gate 90 to pivot into a position indicated by solid line in FIG. 5, thereby performing switching to the branch path 102 reaching the document catch tray 92.

The control section detects the size of the document based on the distance between document restricting guides 911 (see FIG. 4) provided on opposite edges of the document load tray 91 and the result of detection by a travel detection sensor 912 configured to detect a document traveling distance. The distance between the document restricting guides 911, which is equal to the width of a document, is measured by a sensor (not shown) provided on the document restricting guides 911. The document traveling distance is equal to the length of a document. The size of a document may be specified by the user.

The ADF 120 pays out documents one by one from the document load tray 91 by means of a pickup roller 94 and feeds each document into the document feed path 101 by means of feed rollers 95. The document thus fed is further fed to the first reading glass plate 22 by feed roller pairs 96 and 97 and then fed to the branch point by a feed roller pair 98. When the size of the document is smaller than the predetermined size, the document is ejected onto the document catch tray 93 by a feed roller pair 99. When the size of the document is not smaller than the predetermined size, the document is ejected onto the document catch tray 92 by making a U-turn.

The document feed path 103 on the downstream side of the first reading glass plate 22 is provided with the feed roller pairs 98 and 99 and feeding means 61. The feed roller pair 98 comprises a driving roller forming an upper roller and a driven roller 611 forming a lower roller. The feed roller pair 99 comprises a driving roller forming an upper roller and a driven roller 612 forming a lower roller. The feeding means 61 forms part of the document feed path 103. Since the image reading position on the first reading glass plate 22 and the image reading position on the document platen 21 lie in the same plane, the feeding means 61 is positioned lower than the document platen 21 and accommodated in a protruding portion 201 which protrudes downwardly from the bottom of the ADF 120. The protruding portion 201 is accommodated in the dent portion 131 of the image reading unit 20.

Figure 6:
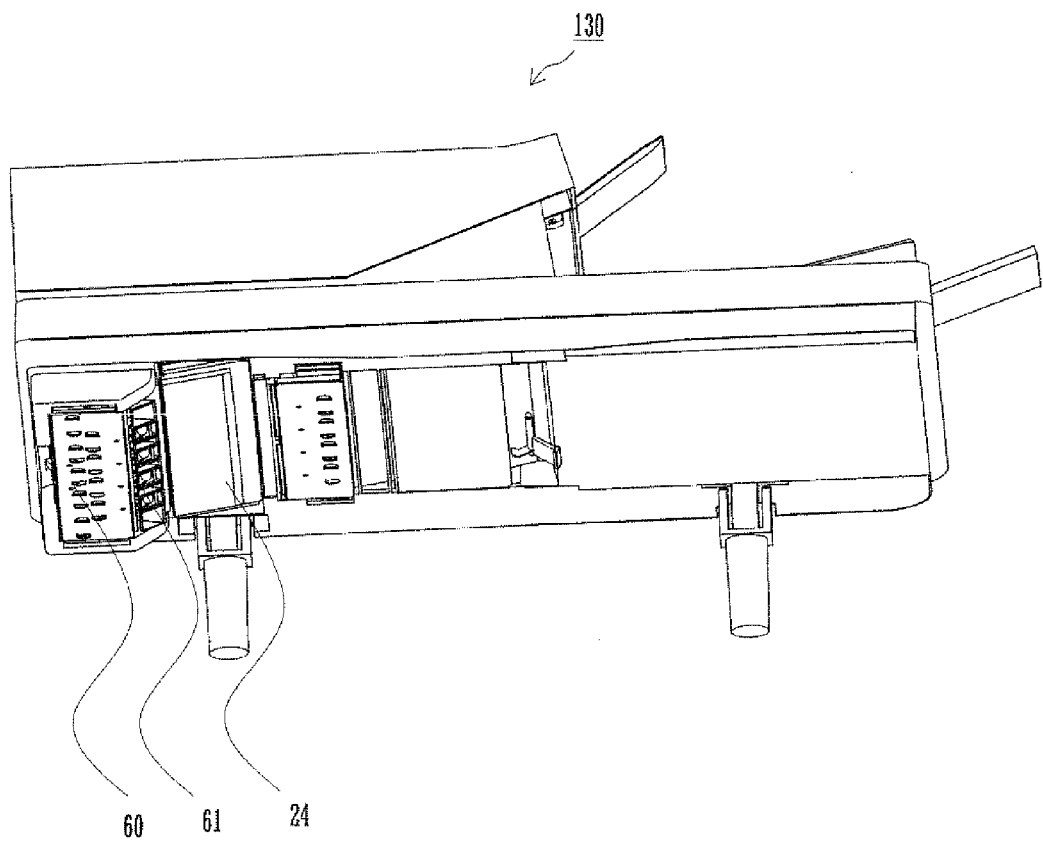
FIG. 6 is an external view illustrating the image reading unit as viewed from below.
Figure 7:
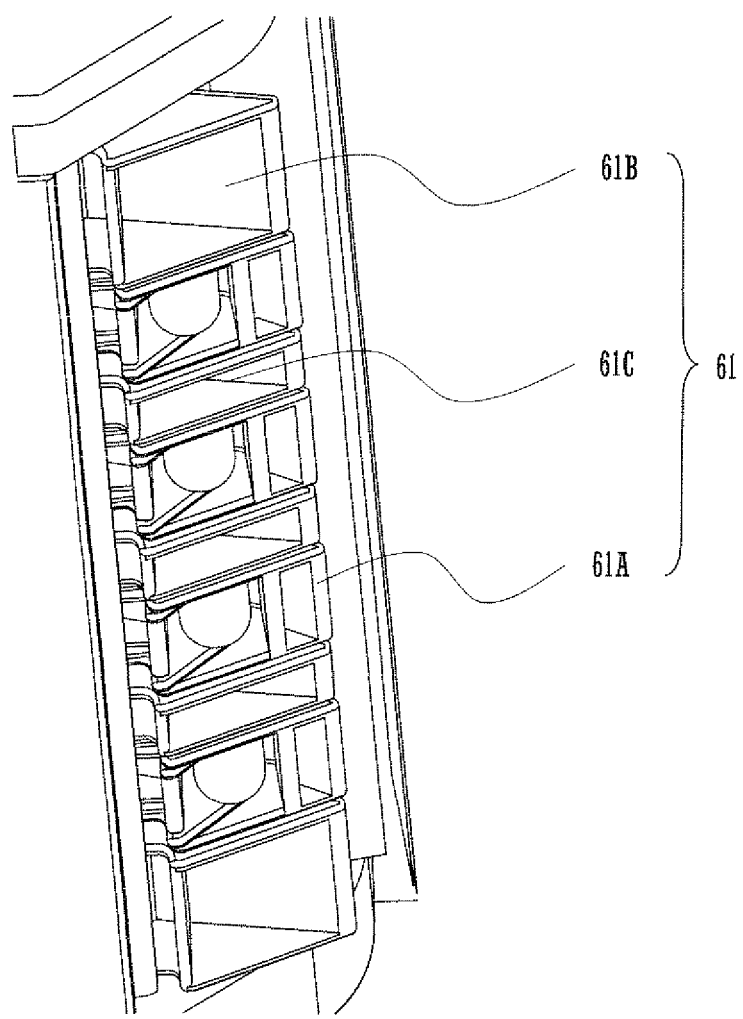
FIG. 7 is a partially enlarged external view illustrating the image reading unit as viewed from below.

The feeding means 61 includes a plurality of feeding guides 61A to 61C (see FIGS. 6 and 7). The feeding guides 61A to 61O are juxtaposed to each other in the widthwise direction of the document feed path 103.

Figure 8:
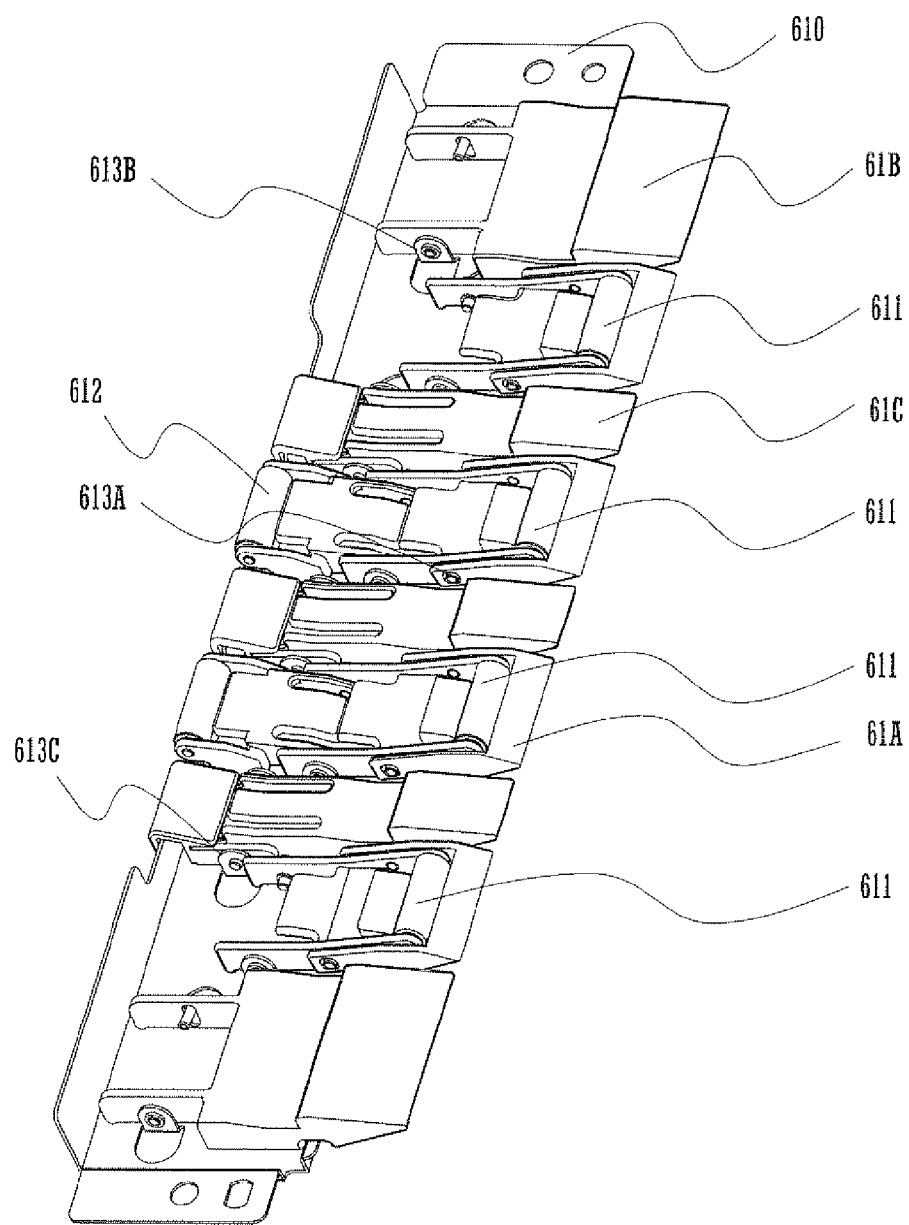
FIG. 8 is an external view illustrating feeding guides juxtaposed to each other on a substrate.
Figure 9:
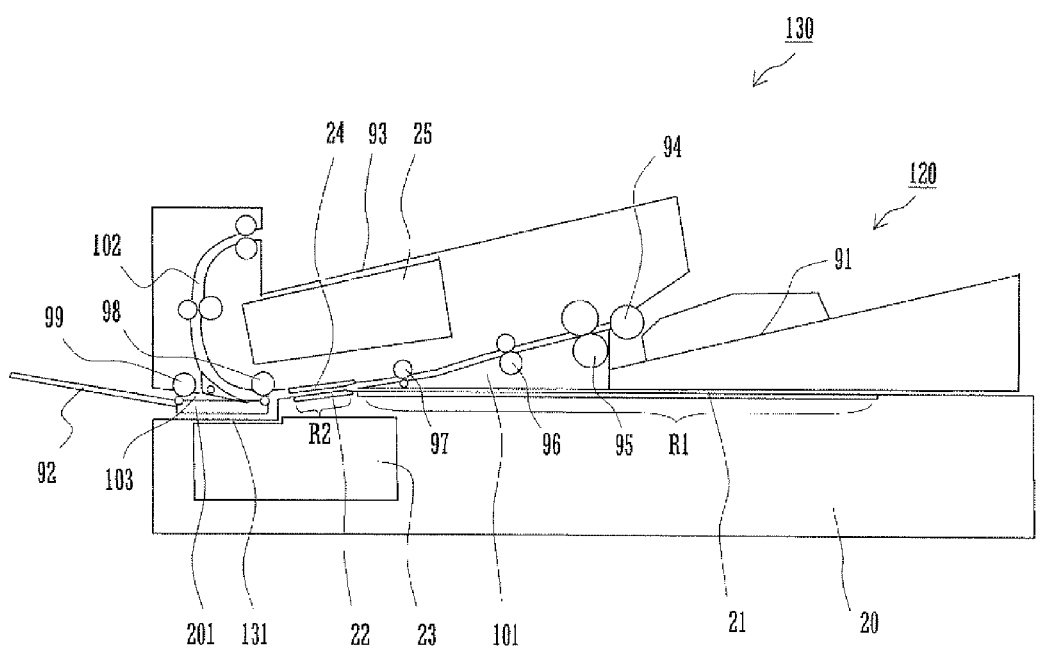
FIG. 9 is a sectional front view schematically illustrating an image forming apparatus according to the related art.
Figure 10:
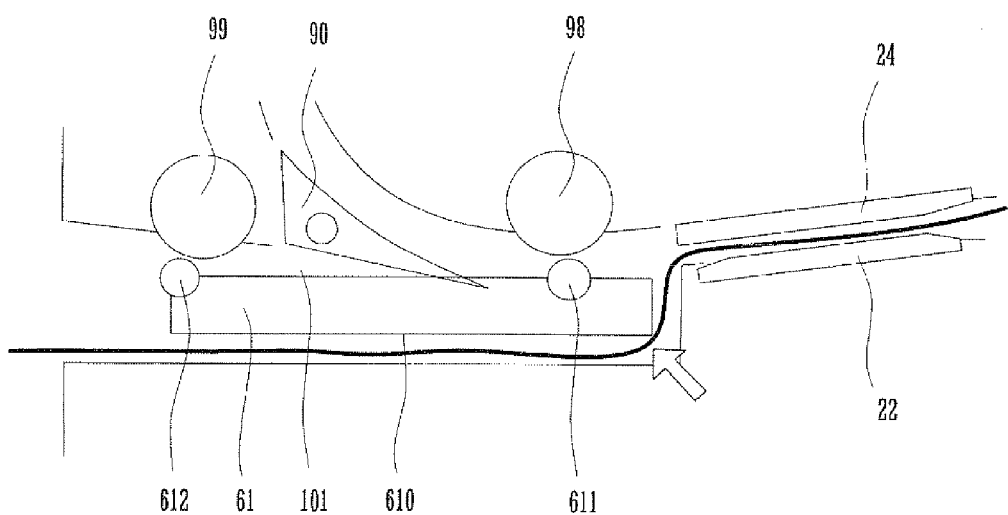
FIG. 10 is a sectional front view schematically illustrating an image reading device according to the related art.

As shown in FIGS. 5 and 8, each of the feeding guides 61A to 61C has an upstream side exposed from a substrate 610 and a downstream side supported on the substrate 610. The substrate 610 forms part of the protruding portion 201 and is mounted on the frame of the ADF 120 in such a manner that its longitudinal axis coincides with the widthwise direction of the document feed path 103 (see FIG. 6).

Each driven roller 611 is mounted on the substrate 610 at a location slightly downstream of the tip of the associated feeding guide 61A. The driven rollers 612 are mounted on the substrate 610 at locations downstream of some of the driven rollers 611. The rotational axes of the driven rollers 611 and 612 are fixed. The feeding guides 61B are located on opposite ends of the substrate 610 and shaped longer than the feeding guides 61A and 61C in the widthwise direction of the document feed path 103. The feeding guides 61C are located next to each feeding guide 61A on opposite sides and shaped shorter than the feeding guides 61A and 61B in the widthwise direction of the is document feed path 103.

The feeding guides 61A to 61C each include a main body for guiding a document and a pair of legs extending from the main body. The substrate 610 includes support shafts 613A to 613C having their axes extending through the pairs of legs of the respective feeding guides 61A to 61C. The support shafts 613A to 613C are each inserted in vertically elongated holes formed in tip portions of the pair of legs of a respective one of the feeding guides 61A to 61C and are each vertically movable within the elongated holes. (FIGS. 5 and 8 shows only one elongated hole associated with the feeding guide 61A.) The elongated holes serve to limit pivotal movement of the feeding guides 61A to 61C.

The feeding guides 61A to 61C are juxtaposed to each other on the substrate 610. Each of the feeding guides 61A to 61C is supported at its downstream end serving as a supporting point to allow its upstream-side portion extending upstream of the supporting point to pivot about an axis parallel with the widthwise direction of the document feed path 103. Thus, the upstream-side portions of the respective feeding guides 61A to 61C are pivotally movable individually. The feeding guides 61A to 61C are juxtaposed to each other in such a manner that their pivotally movable upstream-side portions are exposed from the substrate 610. Therefore, the upstream-side portions are exposed out of the protruding portion 201 on the document platen 20 side. The support shafts 613B and 613C of the feeding guides 61B and 61C have their axes extending in a straight line and are positioned downstream of the support shafts 613A of the feeding guides 61A.

With this arrangement, when the ADF 120 is closed while a document is in a state of failing to extend off the document platen 21 onto the dent portion 131 of the image reading unit 20, the support shafts 613A move downwardly in the respective elongated holes to cause the upstream-side portions of the feeding guides 61A to descend by their own weights to form part of the document feed path. Alternatively, when the ADF 120 is closed while the document is in a state of extending off the document platen 21 onto the dent portion 131, the upstream-side portions of the feeding guides 61A are each pressed up by the document to move into an upper position indicated by dashed dotted line in FIG. 5.

The other feeding guides 61B and 61C operate similarly to the feeding guides 61A. That is, when the ADF 120 is closed while a document is in a state of failing to extending off the document platen 21 onto the dent portion 131 of the image reading unit 20 the support shafts 613B and 613C move downwardly in the respective elongated holes to cause the upstream-side portions of the feeding guides 61B and 61C to descend by their own weights to form part of the document feed path. Alternatively, when the ADF 120 is closed while the document is in a state of extending off the document platen 21 onto the dent portion 131, the upstream-side portions of the feeding guides 61B and 61C are pressed up by the document to move into their upper positions.

Thus, even when the document is in a state of extending off the document platen 21 onto the dent portion 131, the image reading device 130 is not likely to damage the document extending off the document platen.

Since the feeding guide comprises the plurality of feeding guides 61A to 61C, the feeding guides 61A to 61C can move individually into their appropriate designed positions even when the substrate 610 located in the ADF 120 has warpage, distortion or the like. As a result, the feeding guides 61A to 61C can hardly form a factor that impedes the document feeding and, hence, the occurrence of paper jam can be suppressed.

While the foregoing embodiment has the feeding guides 61A to 61C juxtaposed to each other on the substrate 610, the feeding guides 61A to 61C may be juxtaposed to each other directly on the frame of the ADF 120. With this arrangement, even when the frame of the ADF 120 has warpage or distortion, the feeding guides 61A to 61C can move individually into their appropriate positions.

The foregoing embodiment is illustrative in all points and should not be construed to limit the present invention. The scope of the present invention is defined not by the foregoing embodiments but by the following claims. Further, the scope of the present invention is intended to include all modifications within the scopes of the claims and within the meanings and scopes of equivalents.

What is claimed is:

1. An image reading device comprising:
   a document feeding unit capable of covering and uncovering a top surface of a document platen; and
   an image reading unit having a top surface provided with the document platen and a reading glass plate located adjacent to one end of the document platen and configured to read an image of a document placed on the document platen and an image of a document fed from the document feeding unit and passing the reading glass plate, wherein:
   the document feeding unit includes:
      a feed path inclined downwardly from above the document platen to pass the reading glass plate;
      feeding means disposed downstream of the reading glass plate and positioned lower than the document platen; and
      a protruding portion protruding downwardly from a bottom surface of the document feeding unit and accommodating the feeding means therein;
   the image reading unit includes a dent portion accommodating the protruding portion of the document feeding unit and located opposite away from the document platen across the reading glass plate;
   the feeding means includes a feeding guide forming part of a bottom surface of the feed path and having a downstream end in a document feeding direction of the feed path which serves as a supporting point and an upstream-side portion extending upstream of the supporting point and supported at the supporting point for pivotal movement about an axis parallel with a direction perpendicular to the document feeding direction;
   the upstream-side portion of the feeding guide is exposed out of the protruding portion on the document platen side;
   when the document feeding unit is closed while a document is in a state of failing to extend off the document platen onto the dent portion of the image reading unit, the upstream-side portion of the feeding guide descends by its own weight to form part of the feed path; and
   when the document feeding unit is closed while the document is in a state of extending off the document platen onto the dent portion, the upstream-side portion of the feeding guide is pressed up by the document to move into an upper position.

2. The image reading device according to claim 1, wherein the feeding guide comprises a plurality of feeding guides individually supported in the direction perpendicular to the document feeding direction.

3. An image forming apparatus comprising:
   the image reading device according to claim 2; and
   an image forming section configured to form an image on a recording sheet based on image data read from a document by the image reading device.

4. The image reading device according to claim 1, wherein:
   the document feeding unit includes:
      a branch path branching off upwardly from a branch point on the feed path which is located downstream of the reading glass plate;
      detection means configured to detect the size of a document to be fed into the feed path; and
      switching means located at the branch point and configured to feed the document either into a portion of the feed path which extends downstream of the reading glass plate or into the branch path selectively; and
   the switching means feeds the document into the portion of the feed path which extends downstream of the reading glass plate when the size of the document detected by the detection means is smaller than a predetermined size.

5. An image forming apparatus comprising:
   the image reading device according to claim 4; and
   an image forming section configured to form an image on a recording sheet based on image data read from a document by the image reading device.

6. An image forming apparatus comprising:
   the image reading device according to claim 1; and
   an image forming section configured to form an image on a recording sheet based on image data read from a document by the image reading device.

7. An image reading device comprising:
   a document feeding unit capable of covering and uncovering a top surface of a document platen; and
   an image reading unit having a top surface provided with the document platen and a reading glass plate located adjacent to one end of the document platen and configured to read an image of a document placed on the document platen and an image of a document fed from the document feeding unit and passing the reading glass plate, wherein:
   the document feeding unit includes:
      a feed path inclined downwardly from above the document platen to pass the reading glass plate;
      feeding means disposed downstream of the reading glass plate and positioned lower than the document platen; and
      a protruding portion protruding downwardly from a bottom surface of the document feeding unit and accommodating the feeding means therein;
      a branch path branching off upwardly from a branch point on the feed path which is located downstream of the reading glass plate;
      detection means configured to detect the size of a document to be fed into the feed path; and
      switching means located at the branch point and configured to feed the document either into a portion of the feed path which extends downstream of the reading glass plate or into the branch path selectively, and wherein the switching means feeds the document into the portion of the feed path which extends downstream of the reading glass plate when the size of the document detected by the detection means is smaller than a predetermined size;
   the image reading unit includes a dent portion accommodating the protruding portion of the document feeding unit and located opposite away from the document platen across the reading glass plate;
   the feeding means includes a feeding guide forming part of a bottom surface of the feed path and having a downstream end in a document feeding direction of the feed path which serves as a supporting point and an upstream-side portion extending upstream of the supporting point and supported at the supporting point for pivotal movement about an axis parallel with a direction perpendicular to the document feeding direction;
   the upstream-side portion of the feeding guide is exposed out of the protruding portion on the document platen side.

8. An image forming apparatus comprising:
   the image reading device according to claim 7; and an image forming section configured to form an image on a recording sheet based on image data read from a document by the image reading device.

\* \* \* \* \*